(No Model.)
J. L. WHITESIDE.
AUGER.
No. 277,966. Patented May 22, 1883.
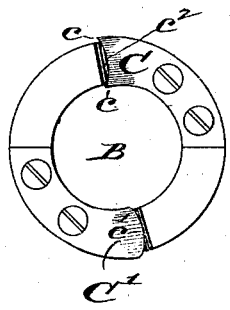
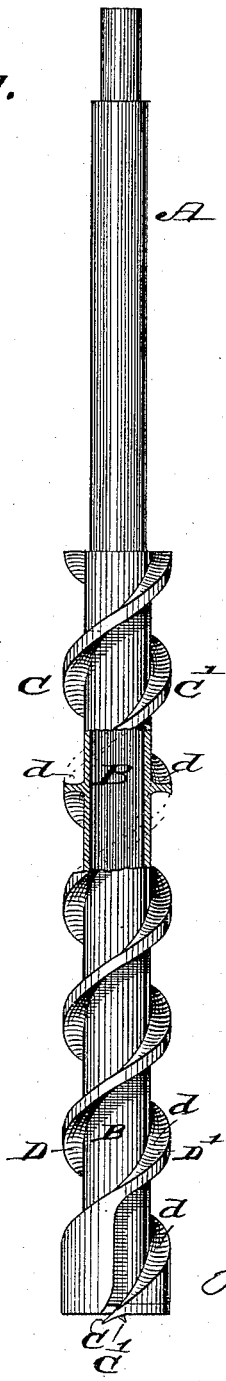
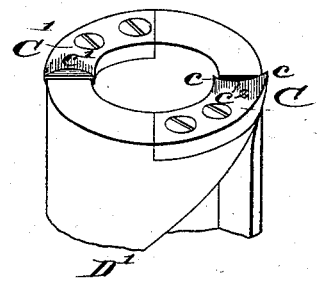
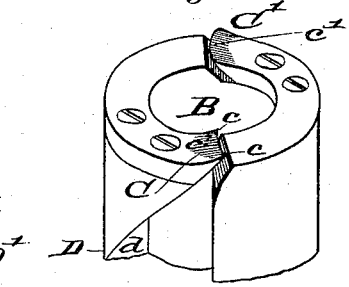
Attest:
Charles Pickles
Albert G. Fish
Inventor:
James L. Whiteside
by C. D. Moody
atty

UNITED STATES PATENT OFFICE.

JAMES L. WHITESIDE, OF CHATTANOOGA, TENNESSEE.

AUGER.

SPECIFICATION forming part of Letters Patent No. 277,966, dated May 22, 1883.

Application filed January 12, 1883. (No model.)

*To all whom it may concern:*

Be it known that I, JAMES L. WHITESIDE, of Chattanooga, Tennessee, have made a new and useful Improvement in Annular Augers, of which the following is a full, clear, and exact description, reference being had to the annexed drawings, making part of this specification, in which—

Figure 1 is a side elevation, partly in section, of the improved auger; Fig. 2, an end elevation; Fig. 3, a view in perspective of the end of the auger, and Fig. 4 another view of the auger end.

The same letters of reference denote the same parts.

The present invention relates to the mode of constructing the cutting-blades, to the blades in combination with the means for removing the shavings, and to the shape of the spiral blades for removing the shavings.

A represents the improved auger. It is composed substantially of the tube B, the cutters C C', and the spiral blades D D'. The tube B is of the usual shape. The cutters C C' are at least two in number. They are so relatively shaped, extended, and arranged as to cause the projection or projections of one of the cutters to come in line, as the auger is rotated, with the depression or depressions of the other of the cutters, and for the purpose of cutting a portion or portions of the wood with one of the cutters, and the remainder of the wood with the other of the cutters. This principle can be carried into practice variously. A desirable mode is that shown, the cutter C being made concave, with two cutting-edges, $c$ $c$, and the cutter C' being made convex, with one cutting-edge, $c'$, and the two cutters being so arranged as to bring the depression $c^2$ between the edges $c$ $c$ as far from the longitudinal axis of the auger as the edge $c'$. Then as the auger is rotated the edges $c$ $c$ cut two shavings, leaving between the shavings a portion, which is cut by the edge $c'$. The advantage of this combination of cutting-edges is that, first, the cutting can be more easily effected, and, second, the auger is less liable to clog, for the shavings cut by the cutter C or C' are narrower and can be more readily removed than if made by a straight uniformly-extended edge. As many blades D D' are employed as there are cutters, the blade D removing the shavings coming from the cutter C, and the blade D' removing the shavings from the cutter C'. The blade D is deeper than the combined widths of the edges $c$ $c$, and the blade D' is deeper than the width of the edge $c'$. This provides ample clearance, and at the same time the entire cut made by the three edges $c$ $c$ $c'$ is reduced to a minimum width. An additional feature is the shape, in cross-section, of the blades D D'. The face $d$ of each blade is made slightly concave, the effect of which is to cause the shaving to hug the tube B, and thereby be more readily removed.

I claim—

The combination, in an annular auger, of two or more cutters relatively shaped to bring the projection or projections of one of the cutters in line with the depression or depressions of another of the cutters, and two or more spiral blades, each having concave faces, all substantially as described.

JAMES L. WHITESIDE.

Witnesses:
  C. D. MOODY,
  GEO. BULLOCK.